United States Patent
Yanai et al.

(10) Patent No.: US 7,378,190 B2
(45) Date of Patent: May 27, 2008

(54) NON-AQUEOUS ELECTROLYTE SECONDARY BATTERY

(75) Inventors: Atsushi Yanai, Kobe (JP); Yoshinori Kida, Kobe (JP); Toshiyuki Nohma, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 498 days.

(21) Appl. No.: 11/082,050

(22) Filed: Mar. 17, 2005

(65) Prior Publication Data

US 2005/0208384 A1   Sep. 22, 2005

(30) Foreign Application Priority Data

Mar. 18, 2004  (JP) .............. 2004-078017

(51) Int. Cl.
*H01M 4/48* (2006.01)
(52) U.S. Cl. ............... 429/231.1; 429/330; 429/337; 429/329; 429/231.3; 429/218.1
(58) Field of Classification Search ............ 429/231.1, 429/330, 337, 329, 231.3, 218.1
See application file for complete search history.

(56) References Cited

U.S. PATENT DOCUMENTS 6,150,053 A   11/2000  Murata et al. ........... 429/218.1
7,135,251 B2 * 11/2006  Cho et al. ................ 429/231.1
2003/0082448 A1  5/2003  Cho et al. ................ 429/218.1

FOREIGN PATENT DOCUMENTS

| JP | 04-014769 | 1/1992 |
| JP | 11-191417 A | 7/1999 |
| JP | 2003-7299 A | 1/2003 |

* cited by examiner

*Primary Examiner*—Laura Weiner
(74) *Attorney, Agent, or Firm*—Kubovcik & Kubovcik

(57) ABSTRACT

Storage performance in a charged state is improved with a non-aqueous electrolyte secondary battery using gamma-butyrolactone as a solvent. A non-aqueous electrolyte secondary battery includes a positive electrode (2) containing a positive electrode active material including a lithium-containing transition metal oxide; a negative electrode (1) containing a negative electrode active material capable of intercalating and deintercalating lithium; and a non-aqueous electrolyte including a solute and a solvent; wherein the solvent contains 50 volume % or more of gamma-butyrolactone with respect to the total volume of the solvent, and the positive electrode active material contains a phosphate salt $M^1PO_4$, where $M^1$ is a metal element capable of having a valency of 3.

12 Claims, 1 Drawing Sheet

NON-AQUEOUS ELECTROLYTE SECONDARY BATTERY

BACKGROUND OF THE INVENTION

1. Field of the Invention

The present invention relates to non-aqueous electrolyte secondary batteries, such as lithium secondary batteries.

2. Description of Related Art

A non-aqueous electrolyte secondary battery that adopts lithium-containing nickel oxide or lithium-containing cobalt oxide as its positive electrode active material has a voltage of about 4 V and shows high capacity. For this reason, research and development on this type of battery have been actively conducted. A non-aqueous electrolyte secondary battery using gamma-butyrolactone (γ-butyrolactone) as a solvent for an electrolyte solution has been regarded as promising because gamma-butyrolactone has a high boiling point and is thermally stable.

However, a problem with a non-aqueous electrolyte secondary battery using gamma-butyrolactone as a solvent for the electrolyte solution has been that it cannot attain sufficient storage performance in a charged state in comparison with batteries using as a solvent a chain carbonate such as diethyl carbonate. A possible cause of the problem is decomposition of gamma-butyrolactone on the positive electrode or the negative electrode.

Japanese Unexamined Patent Publication No. 2003-7299 discloses that the use of a positive electrode active material having aluminum phosphate or the like on the surface improves charge-discharge capacity characteristics, cycle performance, thermal stability, and productivity in a battery that has an electrolyte solution using a mixed solvent of ethylene carbonate and dimethyl carbonate. However, the publication does not mention storage performance in the case of using gamma-butyrolactone. Japanese Unexamined Patent Publication No. 11-191417 discloses that the deterioration in characteristics of a battery exposed to high temperatures temporarily is suppressed by adding such a compound as aluminum phosphate to the positive electrode, the negative electrode, or the electrolyte solution to suppress the reaction between the active material and the electrolyte solution. According to the publication, however, the duration for which the battery is exposed to high temperatures is short, only several minutes, and the publication does not disclose any improvement in a long-term storage performance in a charged state. Moreover, the publication does not contain any disclosure regarding the storage performance in the case of using gamma-butyrolactone as a solvent.

BRIEF SUMMARY OF THE INVENTION

Accordingly, it is an object of the present invention to provide a non-aqueous electrolyte secondary battery having improved storage performance in a charged state, which uses gamma-butyrolactone as a solvent.

The present invention provides a non-aqueous electrolyte secondary battery comprising: a positive electrode containing a positive electrode active material comprising a lithium-containing transition metal oxide; a negative electrode containing a negative electrode active material which intercalates and deintercalates lithium ion; and a non-aqueous electrolyte comprising a solute and a solvent; wherein the solvent contains 50 volume % or more of gamma-butyrolactone with respect to the total volume of the solvent, and the positive electrode active material contains a phosphate salt $M^1PO_4$, where $M^1$ is a metal element capable of having a valency of 3.

DETAILED DESCRIPTION OF THE PREFERRED EMBODIMENTS

Figure 1:
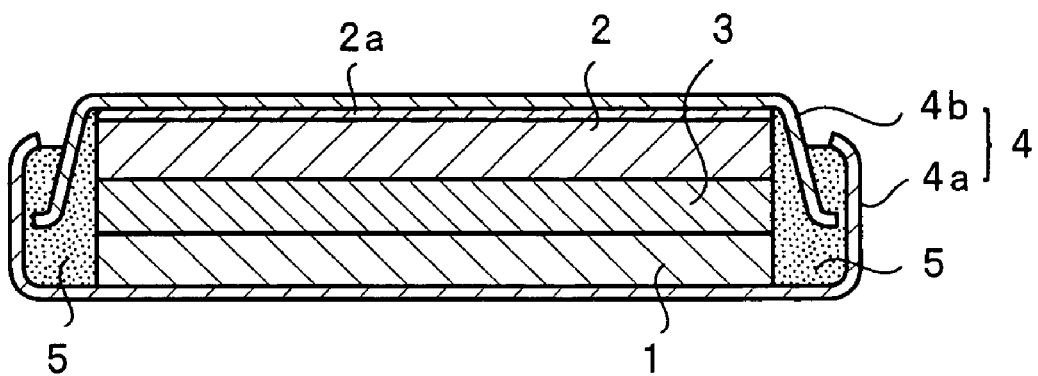
FIG. 1 is a cross-sectional view illustrating a lithium secondary battery fabricated according to one example of the present invention.

Conventionally, a conceivable cause of the degradation in charge-discharge characteristics with a battery using gamma-butyrolactone as a solvent is that a side reaction is promoted in the positive electrode within the battery during storage. Although the details of the cause is not yet clear, it is believed that, by allowing the positive electrode active material to contain a phosphate salt according to the present invention, a stable surface film forms on the surface of the positive electrode active material, and the surface film suppresses a side reaction with the electrolyte solution, improving the storage performance in a charged state.

The phosphate salt used in the present invention is represented by the formula $M^1PO_4$, where $M^1$ is a metal element capable of having a valency of 3. Illustrative examples of the metal element $M^1$ include aluminum, gallium, nickel, cobalt, and iron. From the viewpoint of stability of the phosphate salt in the electrolyte solution, it is preferable that the metal element $M^1$ be, aluminum. Accordingly, a preferable phosphate salt in the present invention is aluminum phosphate ($AlPO_4$).

The positive electrode active material used in the present invention is a lithium-containing transition metal oxide. Examples of the lithium-containing transition metal oxide include lithium-containing cobalt oxide, lithium-containing nickel oxide, and lithium-containing nickel-cobalt composite oxide. Preferably, the lithium-containing transition metal oxide comprises a lithium-containing cobalt oxide as its main component. Furthermore, it is also possible to use an oxide in which the transition metal in the above-noted oxides has been partially substituted by another element. Examples of the other element include at least one element selected from among IIA elements, group IVA elements, group VIIA elements, group VIII elements, group IIB elements, group IIIB elements, and group IVB elements of the periodic table group. More specifically, the other element may include Mn, Fe, Zn, Mg, Ti, Zr, Al, and Sn.

In the present invention, it is preferable that the phosphate salt be contained in the positive electrode active material in an amount of 3 weight % or less with respect to the positive electrode active material. If the content of the phosphate salt is too large, the amount of the positive electrode active material reduces in the positive electrode, worsening the decrease in the discharge capacity. The content of the phosphate salt is preferably 0.8 weight % or less. On the other hand, it is preferable that the phosphate salt be contained at 0.01 weight % or more with respect to the positive electrode active material. If the content of the phosphate salt is too small, the effect of the present invention, an improvement in the storage performance in a charged state, may not be sufficiently attained.

In the present invention, it is believed that the side reaction between the electrolyte solution and the positive electrode active material during storage tends to occur particularly at the positive electrode active material surface. For this reason, it is preferable that in the present invention, the phosphate salt exist at the surface of the positive electrode active material. The method for making the surface of the positive electrode active material contain the phosphate salt may be, for example, causing the phosphate salt to adhere onto the surface of the positive electrode active material and thereafter annealing the positive electrode active material containing the phosphate salt. Specifically, examples of the method include the following methods. (1) A positive electrode active material is added into a suspension of a phosphate salt, then the suspension with the positive electrode active material is mixed and thereafter dried, and the resultant material is annealed. (2) A phosphate salt is precipitated in a suspension of a positive electrode active material to cause the phosphate salt to adhere onto the surface of the positive electrode active material, and thereafter the resultant material is dried and annealed. (3) A coating solution containing the phosphate salt is mixed with an active material powder by spraying the solution onto the powder, and thereafter the resultant material is dried and annealed. Examples of suitable solvents for use in the suspension and the coating solution include water, alcohols such as methanol, ethanol, and isopropanol, and acetone. The coating solution may be in the state of a solution in which the phosphate salt is dissolved, or may be in the state of a suspension in which the phosphate salt is suspended. The annealing permits the phosphate salt to firmly adhere onto the surface of the positive electrode active material. The annealing temperature is preferably 200° C. to 800° C., and more preferably 400° C. to 700° C. The annealing time is preferably, but is not particularly limited to, about 1 to 20 hours.

The present invention uses a solvent containing 50 volume % or more of gamma-butyrolactone. Since gamma-butyrolactone does not easily wet a separator, which is made of polypropylene or the like, it is preferable that a surfactant be added to the electrolyte solution for the purpose of improving the wettability with the separator, when gamma-butyrolactone is used as a solvent. An example of such a surfactant includes trioctyl phosphate. The surfactant is not limited and any surfactant may be used as long as the wettability of the solvent with the separator is improved.

In the present invention, the negative electrode active material used for the negative electrode may be any negative electrode material that has been conventionally used for non-aqueous electrolyte secondary batteries. Specific examples include metallic lithium; lithium alloys such as lithium-aluminum alloy, lithium-lead alloy, lithium-silicon alloy, and lithium-tin alloy; carbon materials such as graphite, coke, and sintered organic materials; as well as metal oxides whose potentials are lower than that of the positive electrode active material, such as $SnO_2$, $SnO$, and $TiO_2$.

The solvent for the non-aqueous electrolyte in the present invention is not particularly limited as long as it contains 50 volume % or more of gamma-butyrolactone. The solvent to be mixed with gamma-butyrolactone may be any solvent that can be used for non-aqueous electrolyte batteries. Examples of such a solvent include: cyclic carbonic esters such as ethylene carbonate, propylene carbonate, 1,2-butylene carbonate, and 2,3-butylene carbonate; cyclic esters such as propane sultone; chain carbonic esters such as ethyl methyl carbonate, diethyl carbonate, and dimethyl carbonate; chain ethers such as 1,2-dimethoxyethane, 1,2-diethoxyethane, diethyl ether, and ethyl methyl ether; as well as methyl acetate, ethyl acetate, propyl acetate, methyl propionate, ethyl propionate, tetrahydrofuran, 2-methyltetrahydrofuran, 1,4-dioxane, and acetonitrile. Among them, ethylene carbonate is particularly preferable.

Examples of suitable solutes for use in the present invention include $LiBF_4$, $LiPF_6$, $LiCF_3SO_3$, $LiN(C_lF_{2l+1}SO_2)(C_mF_{2m+1}SO_2)$ (where 1 and m are integers equal to or greater than 1), $LiC(C_pF_{2p+1}SO_2)(C_qF_{2q+1}SO_2)(C_rF_{2r+1}SO_2)$ (where p, q, and r are intege equal to or greater than 1), $Li[(C_2O_4)_2B]$, $LiBF_2(C_2O_4)$, $LiPF_4(C_2O_4$ and $LiPF_2(C_2O_4)_2$, which may be used either alone or in a combination of two or more of them. In particular, it is desirable that at least $LiBF_4$ be contained, which forms a stable surface film. It is preferable that the solute be dissolved in the non-aqueous electrolyte at a concentration of 0.1 to 1.5 M (mole/liter), more preferably 0.5 to 1.5 M (mole/liter).

According to the present invention, the storage performance in a charged state, which has been a problem with the conventional cases in which gamma-butyrolactone is contained in an amount of 50 volume % or more with respect to the total volume of the solvent, can be improved by allowing the positive electrode active material to contain a phosphate salt.

Hereinbelow, the present invention is described in further detail based on examples thereof. It should be construed, however, that the present invention is not limited to the following examples but various changes and modifications are possible without departing from the scope of the invention.

EXPERIMENT 1

EXAMPLE 1

Preparation of Positive Electrode

Aluminum nitrate was mixed with an ammonium phosphate solution to prepare a suspension of aluminum phosphate ($AlPO_4$). $LiCoO_2$ was added to this suspension so that the weight ratio of $LiCoO_2$ and $AlPO_4$ became 100:0.2, and were then mixed together. This mixture was dried and thereafter annealed at 500° C. for 10 hours. A positive electrode active material was thus prepared.

The positive electrode active material thus prepared and carbon powder as a conductive agent were mixed at a weight ratio of 90:5 to prepare a positive electrode mixture. A solution in which fluorocarbon polymer powder (poly(vinylidene fluoride)) as a binder agent was dissolved into N-methyl-2-pyrrolidone was added to the positive electrode mixture, and a slurry was prepared so that the weight ratio of the positive electrode mixture to poly(vinylidene fluoride) became 95:5. The slurry was applied on one side of a positive electrode current collector made of aluminum foil by doctor blading, which was then dried and rolled. The rolled material was cut into a disk having a diameter of 20 mm to prepare a positive electrode.

Preparation of Negative Electrode

A 20 mm diameter disk was stamped out from a rolled lithium plate having a predetermined thickness to prepare a negative electrode (counter electrode).

Preparation of Electrolyte Solution

Ethylene carbonate (EC) and gamma-butyrolactone (BL) were mixed at a volume ratio of 30:70, and lithium tetrafluoroborate ($LiBF_4$) was dissolved into this mixed solvent at a concentration of 1.2 mole/liter. To 100 parts by weight of the solution thus prepared, 2 parts by weight of vinylene carbonate and 2 parts by weight of trioctyl phosphate, serving as a surfactant, were added to prepare an electrolyte solution.

Preparation of Lithium Secondary Battery

As illustrated in FIG. 1, a separator 3 made of microporous polyethylene film was placed between the positive electrode (working electrode) 2 and the negative electrode (counter electrode) 1. Next, in a battery can 4 of a test cell, a positive electrode current collector 2a was brought into contact with a top lid 4b, and the negative electrode 1 was brought into contact with a bottom portion 4a of the battery can 4. These components were accommodated into the battery can 4, and the top lid 4b and the bottom portion 4a were electrically insulated by an insulative packing 5. A non-aqueous electrolyte secondary battery A1 of the present invention was thus prepared.

Evaluation of Storage Performance

The Battery A1 prepared in the above-described manner was tested to measure the percentage of capacity retention according to the following conditions.

Test conditions
   Conditions of storage in a charged state
      Temperature: 60° C., Duration: 10 days
   Discharge capacity test before and after the storage
      Charge current: 2.36 mA to 0.79 mA, End-of-charge voltage: 4.3 V,
      Temperature during charge: 25° C.
      Discharge current: 0.79 mA, End-of-discharge voltage: 2.75 V,
      Temperature during discharge: 25° C.

The percentage of capacity retention was calculated according to the following equation.

Percentage of capacity retention (%)={(Discharge capacity after 10-day storage at 60° C.)/(Discharge capacity before storage)}×100

A greater percentage of capacity retention determined by the above equation means that the battery has better storage performance in a charged state.

The measurement result of the percentage of capacity retention is shown in Table 1 below.

COMPARATIVE EXAMPLE 1

A Comparative Battery X1 was prepared in the same manner as Example 1 except that, when preparing the positive electrode, $LiCoO_2$ that did not contain $AlPO_4$ was used as the positive electrode active material, and its storage performance was evaluated. The result is shown also in Table 1.

COMPARATIVE EXAMPLE 2

In preparing a positive electrode, $Al_2O_3$ (reagent) was added so that the weight ratio of $LiCoO_2$ to $Al_2O_3$ was 100:0.5, and the mixture was annealed at 500° C. for 10 hours. A Comparative Battery X2 was prepared in the same manner as in Example 1 except that the above-described material was used as the positive electrode active material, and its storage performance was evaluated. The result is also shown in Table 1.

COMPARATIVE EXAMPLE 3

In preparing an electrolyte solution, as the electrolyte solution, the lithium hexafluorophosphate ($LiPF_6$) was dissolved at a concentration of 1.0 mole/liter into a solvent in which ethylene carbonate and ethyl methyl carbonate (EMC) were mixed at a volume ratio of 30:70. To 100 parts by weight of the solution thus prepared, 2 parts by weight of vinylene carbonate was added to prepare an electrolyte solution. A Comparative Battery Y0 was prepared in the same manner as in Comparative Example 1 except that the electrolyte solution prepared in the above-described manner was used, and its storage performance was evaluated. The result is also shown in Table 1.

COMPARATIVE EXAMPLE 4

In preparing an electrolyte solution, as the electrolyte solution, lithium hexafluorophosphate ($LiPF_6$) was dissolved at a concentration of 1.0 mole/liter into a solvent in which ethylene carbonate and ethyl methyl carbonate were mixed at a volume ratio of 30:70. To 100 parts by weight of the solution thus prepared, 2 parts by weight of vinylene carbonate was added to prepare an electrolyte solution. A Comparative Battery Y1 was prepared in the same manner as in Example 1 except that the electrolyte solution prepared in the above-described manner was used, and its storage performance was evaluated. The result is also shown in Table 1.

TABLE 1

| | | Positive electrode | Amount added (wt. %) | Electrolyte | Capacity retention (%) |
|---|---|---|---|---|---|
| Comparative battery | X1 | $LiCoO_2$ (no additive) | 0.0 | EC/BL | 71 |
| | X2 | $LiCoO_2$ ($Al_2O_3$ added) | 0.5 | EC/BL | 76 |
| Battery of the invention | A1 | $LiCoO_2$ ($AlPO_4$ added) | 0.2 | EC/BL | 83 |
| Comparative battery | Y0 | $LiCoO_2$ (no additive) | 0.0 | EC/EMC | 84 |
| | Y1 | $LiCoO_2$ ($AlPO_4$ added) | 0.2 | EC/EMC | 86 |

It is clearly demonstrated from the comparison between the Battery A1 of the invention and the Comparative Batteries X1 and X2 that in the cases where gamma-butyrolactone was used as a solvent, the percentage of capacity retention increased and the storage performance in a charged state improved when $AlPO_4$ was added to the positive electrode active material ($LiCoO_2$). Japanese Unexamined Patent Publication No. 11-191417 mentions the addition of $Al_2O_3$, which was added in the Comparative Battery X2, but the addition of $Al_2O_3$ did not show an improvement in the percentage of capacity retention.

Moreover, it is clearly demonstrated from the comparison between the Comparative Batteries Y0 and Y1 that, in cases where gamma-butyrolactone was not used, little improvement in the percentage of capacity retention was observed even when $AlPO_4$ was added to the positive electrode active material.

EXPERIMENT 2

EXAMPLE 2

Figure 2:
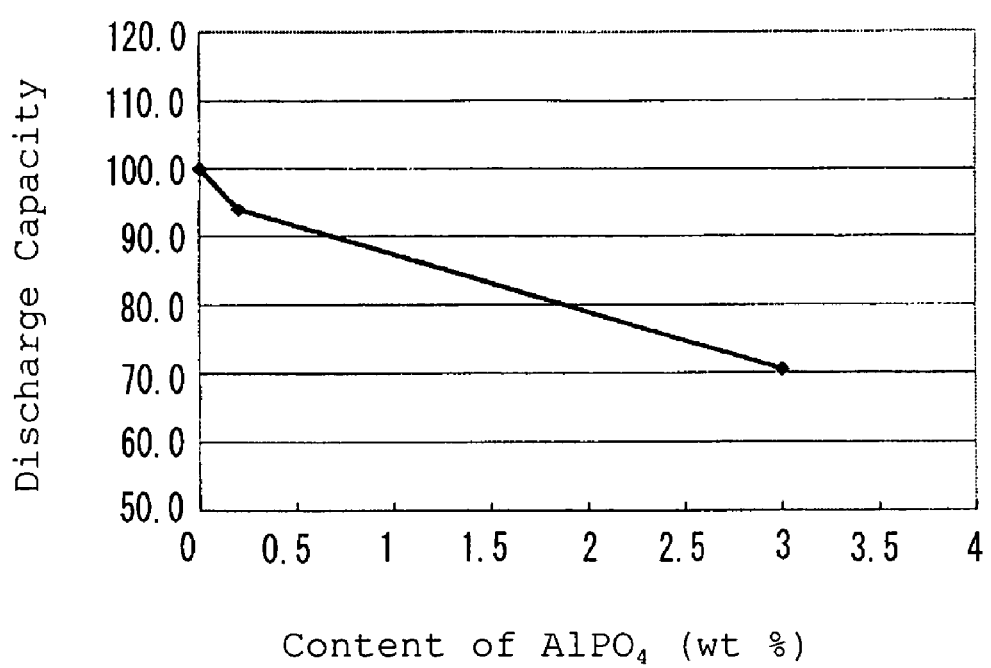
FIG. 2 is a graph illustrating the relationship between content of $AlPO_4$ in the positive electrode active material and discharge capacity.

A Battery A2 of the invention was prepared in the same manner as in Example 1 except that the weight ratio of $LiCoO_2$ to $AlPO_4$ was 100:3 in preparing the positive electrode. The discharge capacity of this Battery A2 as well as those of the Comparative Battery X1 and the Battery A1 of the invention in Experiment 1 is shown in Table 2. The discharge capacities shown in Table 2 are relative indices when the capacity of the Comparative Battery X1 is taken as 100. FIG. 2 shows the relationship between $AlPO_4$ content (amount added) and discharge capacity.

TABLE 2

| | | Positive electrode | Amount added (wt. %) | Electrolyte | Discharge Capacity (%) |
|---|---|---|---|---|---|
| Comparative battery | X1 | $LiCoO_2$ (no additive) | 0.0 | EC/BL | 100 |
| Battery of the invention | A1 | $LiCoO_2$ ($AlPO_4$ added) | 0.2 | EC/BL | 94 |
| Battery of the invention | A2 | $LiCoO_2$ ($AlPO_4$ added) | 3.0 | EC/BL | 71 |

Table 2 and FIG. 2 clearly demonstrate that as the content of $AlPO_4$ increases, the discharge capacity decreases. In particular, when the content exceeds 3 weight %, the discharge capacity decreases to 70% or less. Accordingly, it is demonstrated that the content of $AlPO_4$ should preferably be 3 weight % or less, in order to satisfy the basic performance as a battery.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

This application claims priority of Japanese patent application No. 2004-078017 filed Mar. 18, 2004, which is incorporated herein by reference.

What is claimed is:

1. A non-aqueous electrolyte secondary battery comprising: a positive electrode containing a positive electrode active material comprising a lithium-containing transition metal oxide; a negative electrode containing a negative electrode active material capable of intercalating and deintercalating lithium ion; and a non-aqueous electrolyte comprising a solute and a solvent;

wherein the solvent contains 50 volume % or more of gamma-butyrolactone with respect to the total volume of the solvent, and the positive electrode active material contains a phosphate salt $M^1PO_4$, where $M^1$ is a metal element capable of having a valency of 3, in a proportion of 3 weight % or less with respect to the positive electrode active material.

2. The non-aqueous electrolyte secondary battery according to claim 1, wherein the phosphate salt exists at at least a portion of a surface of the positive electrode active material.

3. The non-aqueous electrolyte secondary battery according to claim 1, wherein the phosphate salt is aluminum phosphate ($AlPO_4$).

4. A non-aqueous electrolyte secondary battery comprising: a positive electrode containing a positive electrode active material comprising a lithium-containing transition metal oxide; a negative electrode containing a negative electrode active material capable of intercalating and deintercalating lithium ion; arid a non-aqueous electrolyte comprising a solute and a solvent;

wherein the lithium-containing transition metal oxide comprises a lithium-containing cobalt oxide as its main component; the solvent contains 50 volume % or more of gamina-butyrolactone with respect to the total volume of the solvent; and the positive electrode active material contains a phosphate salt $M^1PO_4$, where $M^1$ is a metal element capable of having a valency of 3, in a proportion of 3 weight % or less with respect to the positive electrode active material.

5. The non-aqueous electrolyte secondary battery according to claim 4, wherein the phosphate salt exists at at least a portion of a surface of the positive electrode active material.

6. The non-aqueous electrolyte secondary battery according to claim 4, wherein the phosphate salt is aluminum phosphate ($AlPO_4$).

7. A non-aqueous electrolyte secondary battery comprising: a positive electrode containing a positive electrode active material comprising a lithium-containing transition metal oxide; a negative electrode containing a negative electrode active material capable of intercalating and deintercalating lithium ion; and a non-aqueous electrolyte comprising a solute and a solvent;

wherein the solvent contains 50 volume % or more of gamma-butyrolactone with respect to The total volume of the solvent, and the positive electrode active material contains a phosphate salt $M^1PO_4$, where $M^1$ is a metal element capable of having a valency of 3, in a proportion of 3 weight % or less with respect to the positive electrode active material, and the phosphate salt being contained within the positive electrode active material by causing the phosphate salt to adhere onto a surface of the positive electrode active material and thereafter annealing the positive electrode active material containing the phosphate salt.

8. The non-aqueous electrolyte secondary battery according to claim 7, wherein the lithium-containing transition metal oxide comprises a lithium-containing cobalt oxide as its main component.

9. The non-aqueous electrolyte secondary battery according to claim 8, wherein the phosphate salt is aluminum phosphate ($AlPO_4$).

10. The non-aqueous electrolyte secondary battery according to claim 7, wherein the phosphate salt exists at at least a portion of a surface of the positive electrode active material.

11. The non-aqueous electrolyte secondary battery according to claim 10, wherein the phosphate salt is aluminum phosphate ($AlPO_4$).

12. The non-aqueous electrolyte secondary battery according to claim 7, wherein the phosphate salt is aluminum phosphate ($AlPO_4$).

* * * * *